United States Patent
Tao et al.

(10) Patent No.: US 9,420,369 B2
(45) Date of Patent: Aug. 16, 2016

(54) PROCESSING METHOD FOR EARPHONE AND USER EQUIPMENT

(71) Applicant: Huawei Device Co., LTD, Shenzhen (CN)

(72) Inventors: Rui Tao, Beijing (CN); Wei Ji, Beijing (CN)

(73) Assignee: HUAWEI DEVICE CO., LTD., Shenzhen (CN)

(*) Notice: Subject to any disclaimer, the term of this patent is extended or adjusted under 35 U.S.C. 154(b) by 457 days.

(21) Appl. No.: 13/871,471

(22) Filed: Apr. 26, 2013

(65) Prior Publication Data

US 2013/0236027 A1    Sep. 12, 2013

Related U.S. Application Data

(63) Continuation of application No. PCT/CN2011/081375, filed on Oct. 27, 2011.

(30) Foreign Application Priority Data

Oct. 28, 2010  (CN) .......................... 2010 1 0528586

(51) Int. Cl.
  *H04R 3/00* (2006.01)
  *H04R 1/10* (2006.01)
  *H04W 52/02* (2009.01)
  *H04R 5/04* (2006.01)
  *H04R 5/033* (2006.01)

(52) U.S. Cl.
  CPC ............... *H04R 3/00* (2013.01); *H04R 1/1041* (2013.01); *H04W 52/0241* (2013.01); *H04R 5/033* (2013.01); *H04R 5/04* (2013.01); *H04R 2420/07* (2013.01); *H04R 2460/03* (2013.01); *H04R 2460/07* (2013.01); *Y02B 60/50* (2013.01)

(58) Field of Classification Search
  None
  See application file for complete search history.

(56) References Cited

U.S. PATENT DOCUMENTS

| | | | |
|---|---|---|---|
| 2007/0076897 | A1 | 4/2007 | Philipp |
| 2008/0220831 | A1 | 9/2008 | Alameh et al. |
| 2008/0255690 | A1 | 10/2008 | Wong et al. |
| 2009/0131124 | A1 | 5/2009 | Bibaud et al. |
| 2009/0226013 | A1 | 9/2009 | Burge |
| 2010/0184487 | A1 | 7/2010 | Takada |

FOREIGN PATENT DOCUMENTS

| | | |
|---|---|---|
| CN | 2618392 Y | 5/2004 |
| CN | 1509120 A | 6/2004 |

(Continued)

OTHER PUBLICATIONS

First Office Action of Chinese Application No. 201010528586.0 mailed Feb. 26, 2013, 13 pages. (Partial Translation).

(Continued)

*Primary Examiner* — Curtis Kuntz
*Assistant Examiner* — Qin Zhu
(74) *Attorney, Agent, or Firm* — Slater Matsil, LLP (57) ABSTRACT

A processing method for an earphone includes receiving a sense signal sent by a proximity sensor. A distance between an earphone and an ear corresponding to the earphone is obtained according to the sense signal and compared with a first preset threshold. Within a first preset time, if the distance is greater than the first preset threshold, an audio playing program is closed or an earphone channel of the earphone is closed.

20 Claims, 4 Drawing Sheets

(56) References Cited

FOREIGN PATENT DOCUMENTS

| | | | |
|---|---|---|---|
| CN | 1725767 | A | 1/2006 |
| CN | 1819459 | A | 8/2006 |
| CN | 101001478 | A | 7/2007 |
| CN | 101287300 | A | 10/2008 |
| CN | 101334689 | A | 12/2008 |
| CN | 201174777 | Y | 12/2008 |
| CN | 101663879 | A | 3/2010 |
| CN | 102149033 | A | 8/2011 |
| JP | 2000196725 | A | 7/2000 |
| JP | 2003037651 | A | 2/2003 |
| WO | 2010009636 | A1 | 1/2010 |

OTHER PUBLICATIONS

International Search Report received in Application No. PCT/CN2011/081375 mailed Feb. 23, 2012, 3 pages.

Written Opinion of the International Searching Authority received in Application No. PCT/CN2011/081375 mailed Feb. 23, 2012, 15 pages.

Extended European Search Report received in Application No. 11835634.4-1901, mailed Dec. 11, 2013, 8 pages.

PROCESSING METHOD FOR EARPHONE AND USER EQUIPMENT

CROSS-REFERENCE TO RELATED APPLICATIONS

This application is a continuation of International Application No. PCT/CN2011/081375, filed on Oct. 27, 2011, which claims priority to Chinese Patent Application No. CN201010528586.0, filed on Oct. 28, 2010, all of which are hereby incorporated by reference in their entireties.

TECHNICAL FIELD

Embodiments of the present invention relate to the field of communications technologies, and in particular, to a processing method for an earphone and a user equipment.

BACKGROUND

At present, a user equipment such as a computer, a mobile phone, or a handheld recreation device is provided with earphones. In addition to a left sound channel and a right sound channel, the earphones may be extended to have left and right sound channels plus a microphone, and a key may be supported. Meanwhile, high-grade earphones, such as Bluetooth® earphones, may also support functions such as multiple keys, a volume control knob, and a display screen.

In the process of implementing the present invention, the inventors find that the prior art has at least the following problem. When a user takes off an earphone and forgets to close a playing program, the earphone may keep working, which shortens the service life of the earphone, and especially for a user equipment using batteries, may waste the power of the user equipment.

SUMMARY OF THE INVENTION

Embodiments of the present invention provide a processing method for an earphone and user equipment for prolonging the service life of the earphone and saving energy for the user equipment.

An embodiment of the present invention provides a processing method for an earphone, including collecting and obtaining a sense signal, obtaining a distance between an earphone and an ear corresponding to the earphone according to the sense signal, and comparing the distance with a first preset threshold, and within a first preset time, if the distance is greater than the first preset threshold, closing an audio playing program or closing an earphone channel of the earphone.

An embodiment of the present invention provides a user equipment, including a collecting module configured to collect and obtain a sense signal, a comparing module configured to obtain a distance between an earphone and an ear corresponding to the earphone according to the sense signal, and compare the distance with a first preset threshold, and a close module configured to: within a first preset time, if the distance is greater than the first preset threshold, close an audio playing program or close an earphone channel of the earphone.

The processing method for the earphone and the user equipment according to embodiments of the present invention collect and obtain a sense signal, obtain the distance between an earphone and an ear corresponding to the earphone according to the sense signal, and within a first preset time, if the distance is greater than a first preset threshold, close an audio playing program or close an earphone channel of the earphone. A user action of taking off an earphone is identified by receiving a sense signal sent by a proximity sensor to automatically close an audio playing program, thereby prolonging the service life of the earphone and saving energy for the user equipment.

BRIEF DESCRIPTION OF THE DRAWINGS

To illustrate the technical solutions according to the embodiments of the present invention more clearly, accompanying drawings required for describing the embodiments are introduced briefly below. Apparently, the accompanying drawings in the following description are merely some embodiments of the present invention, and persons of ordinary skill in the art may further obtain other drawings according to the accompanying drawings without creative efforts.

DETAILED DESCRIPTION OF ILLUSTRATIVE EMBODIMENTS

To make the objectives, technical solutions, and advantages of the embodiments of the present invention clearer, the technical solutions provided by the embodiments of the present invention are hereinafter described clearly and completely with reference to the accompanying drawings. Evidently, the described embodiments are only some exemplary embodiments of the present invention, rather than all embodiments of the present invention. All other embodiments obtained by persons of ordinary skill in the art based on the embodiments of the present invention without creative efforts shall fall within the protection scope of the present invention.

Figure 1:
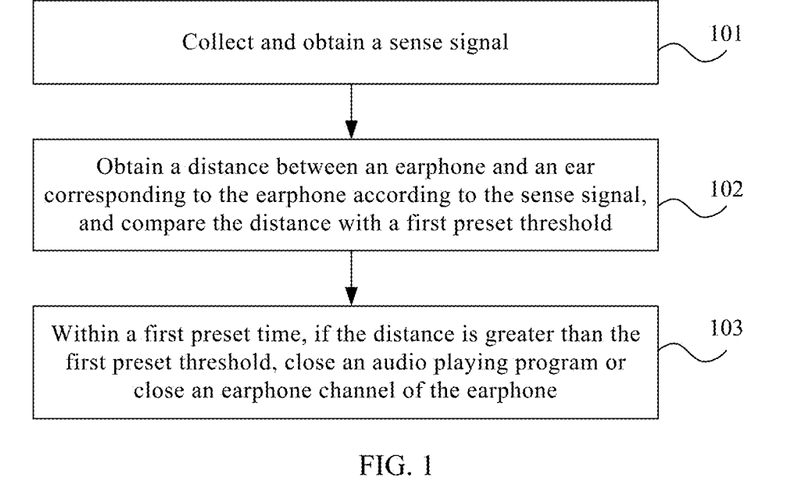
FIG. 1 is a flowchart of a processing method for an earphone according to an embodiment of the present invention.

FIG. 1 is a flowchart of a processing method for an earphone according to an embodiment of the present invention. As shown in FIG. 1, the method according to this embodiment includes the following steps.

Step 101: Collect and obtain a sense signal.

In this embodiment, a sense signal may be collected and obtained by using a reflective optical proximity sensor and the proximity sensor may be arranged on an earphone. It should be noted that the proximity sensor may be designed to have a very small size so that it may be embedded in a smallest earphone. The proximity sensor may specifically be a reflective optical proximity sensor. The proximity sensor may include an infrared thin-film emitter, an optical detector, and an application-specific integrated circuit (Application Specific Integrated Circuit, ASIC for short). Specifically, the infrared thin-film emitter emits infrared light which is invisible to human eyes, the optical detector detects a quantity of light reflected from an ear, and finally the ASIC outputs a corresponding sense signal to a user equipment.

In this embodiment, the proximity sensor may transfer the sense signal by using a data wire. In this embodiment, the earphone may be an earphone having an interface with at least five data wires for transferring sense signals and audio signals; or to be compatible with an existing universal 3.5 mm three-pole earphone interface configured on a user equipment, an adapter may be added to convert an earphone having a proximity sensor to an earphone having a universal interface, and then connected to the universal 3.5 mm three-pole earphone interface, so that the proximity sensor sends the sense signal to the user equipment.

In addition, the user equipment may have two separate interfaces, where, one interface is a universal 3.5 mm three-pole earphone interface for transferring audio signals, and the other is a dedicated interface for transferring sense signals. The dedicated interface may be in the form of various communication interfaces such as a serial interface or a universal serial bus (Universal Serial Bus USB for short) interface depending on the user equipment.

More specifically, for a wireless earphone, a proximity sensor may send a sense signal to a user equipment through a wireless network.

Step 102: Obtain a distance between an earphone and an ear corresponding to the earphone according to the sense signal, and compare the distance with a first preset threshold.

In this embodiment, after receiving a sense signal, a user equipment obtains the distance between an earphone and an ear corresponding to the earphone according to the sense signal, and compares the distance with a first preset threshold. For example, when a user takes off an earphone, the distance between the earphone and the ear corresponding to the earphone is greater than the first preset threshold; when the user inserts the earphone, the distance between the earphone and the ear corresponding to the earphone is smaller than or equal to the first preset threshold.

Step 103: Within a first preset time, if the distance is greater than the first preset threshold, close an audio playing program or close an earphone channel of the earphone.

In this embodiment, when a user equipment plays an audio, the user equipment may obtain the distance between an earphone and an ear corresponding to the earphone according to a received sense signal. Within a first preset time, when it is determined that the distance between the earphone and the ear corresponding to the earphone is greater than the first preset threshold, it is considered that a user has taken the earphone off the ear, and an audio playing program may be closed.

In addition, when the user equipment closes the audio playing program, the user equipment may also obtain the distance between the earphone and the ear corresponding to the earphone according to a received sense signal. When it is determined that the distance between the earphone and the ear corresponding to the earphone is smaller than or equal to the first preset threshold, it is considered that the user has inserted the earphone, and the audio playing program may be started.

In this embodiment, a sense signal is collected and obtained. The distance between an earphone and an ear corresponding to the earphone is obtained according to the sense signal. Within a first preset time, if the distance is greater than a first preset threshold, an audio playing program is closed or an earphone channel of the earphone is closed. A user's action of taking off an earphone is identified by receiving a sense signal sent by a proximity sensor to automatically close an audio playing program, thereby prolonging the service life of the earphone and saving energy for the user equipment.

Figure 2:
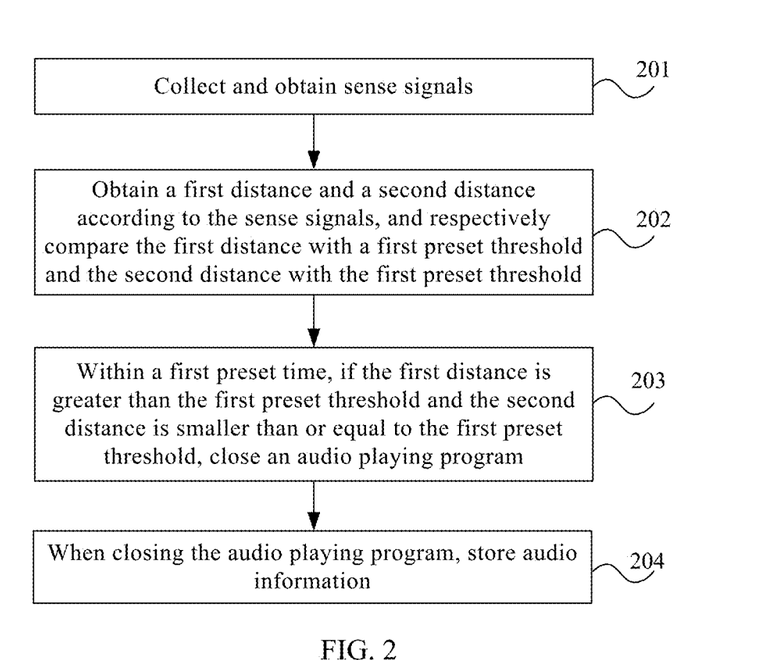
FIG. 2 is a flowchart of a processing method for an earphone according to another embodiment of the present invention.

FIG. 2 is a flowchart of a processing method for an earphone according to another embodiment of the present invention. As shown in FIG. 2, the method according to this embodiment includes the following steps.

Step 201: Collect and obtain sense signals.

Figure 3:
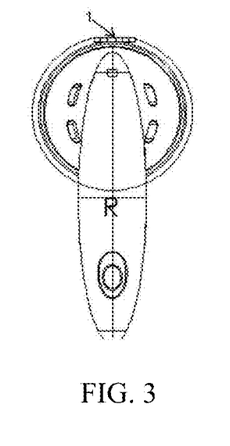
FIG. 3 is a schematic diagram showing a position of a proximity sensor arranged on an earphone according to the present invention.

In this embodiment, the implementation of step 201 is similar to the implementation of step 101 in FIG. 1, and will not be described repeatedly herein. It should be noted that the earphone may include a first earphone and a second earphone, where the distance between the first earphone and an ear corresponding to the first earphone may be referred to as a first distance, and the distance between the second earphone and an ear corresponding to the second earphone may be referred to as a second distance. A proximity sensor may be arranged at any place around the first earphone and the second earphone, for example, as shown in FIG. 3. FIG. 3 is a schematic diagram showing a position of a proximity sensor arranged on an earphone according to the present invention, where the mark 1 indicates the proximity sensor.

Step 202: Obtain the first distance and the second distance according to the sense signals, and respectively compare the first distance with a first preset threshold and the second distance with the first preset threshold.

In this embodiment, the implementation of step 202 is similar to the implementation of step 102 in FIG. 1, and will not be described repeatedly herein. It should be noted that the proximity sensor may be arranged at any place around the earphone; therefore, the proximity sensor may accurately determine the distance between an earphone and a wall of an ear canal, thereby inferring a depth in which the earphone is inserted and identifying a user's action of taking off or inserting the earphone.

Step 203: Within a first preset time, if the first distance is greater than the first preset threshold and the second distance is smaller than or equal to the first preset threshold, close an audio playing program.

In this embodiment, when a user equipment is playing an audio and a user takes off a first earphone of two earphones, the user equipment determines, according to a received sense signal, that the distance between the first earphone and a wall of an ear canal corresponding to the first earphone is greater than a first preset threshold, that is, accurately determines that the first earphone leaves the ear corresponding to the first earphone. Meanwhile, to prevent the audio playing program from being closed because the first earphone falls off unintentionally, the audio playing program is not closed immediately. Instead, within a first preset time, for example, 10 seconds, a next sense signal sent by the proximity sensor arranged on the first earphone is received. If, according to the next sense signal, it is determined that the distance between the first earphone and the wall of the ear canal corresponding to the first earphone is still greater than the first preset threshold, the audio playing program is closed. It should be noted that the user equipment is capable of identifying the user's action of taking off the earphone if either one of the earphones inserted into the ears is taken off, and then closing the audio playing program.

It should be noted that for a wireless earphone, when the user equipment closes the audio playing program, the wireless earphone receives a sense signal sent by a proximity sensor through a wireless network, obtains, according to the sense signal, the distance between an earphone and an ear corresponding to the earphone and when determining that the distance between the earphone and the ear corresponding to the earphone is greater than the first preset threshold, turns off a power supply thereof, thereby effectively prolonging the service life of the wireless earphone.

Step 204: When the audio playing program is being closed, store audio information.

In this embodiment, the user equipment may also record position information where the audio playing program is closed, for example, information concerning a channel of a radio, volume, and the like. When the user inserts the earphone and the audio playing program is started, the user equipment may also start the audio playing program according to the stored audio information, so that the user equipment may continue playing the audio previously closed In this embodiment, a sense signal is collected and obtained, the distance between an earphone and a wall of an ear canal is obtained according to the sense signal, and then the distance is compared with a first preset threshold. If, within a first preset time, the distance between a first earphone and an ear is greater than a first preset threshold and the distance between a second earphone and an ear is smaller than or equal to the first preset threshold, it is identified that a user has taken off the first earphone, and an audio playing program is closed, thereby prolonging the service life of the earphone and saving energy for the user equipment.

Figure 4:
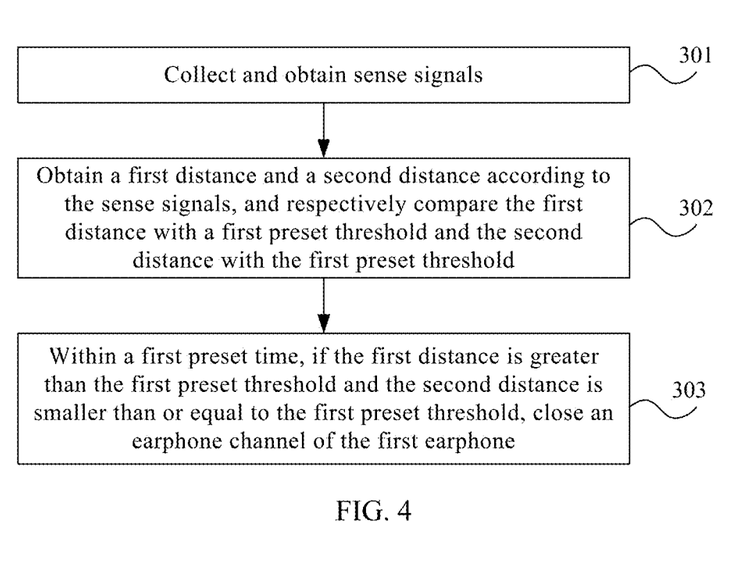
FIG. 4 is a flowchart of a processing method for an earphone according to another embodiment of the present invention.

FIG. 4 is a flowchart of a processing method for an earphone according to another embodiment of the present invention. As shown in FIG. 4, the method according to this embodiment includes the following steps.

Step 301: Collect and obtain sense signals.

Figure 5:
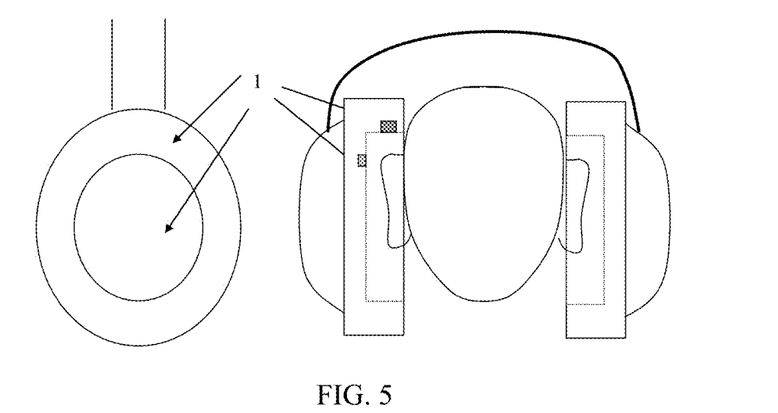
FIG. 5 is a schematic diagram showing another position of a proximity sensor arranged on an earphone according to the present invention.

In this embodiment, the implementation of step 301 is similar to the implementation of step 101 in FIG. 1, and will not be described repeatedly herein. It should be noted that the earphone may include a first earphone and a second earphone, where the distance between the first earphone and an ear corresponding to the first earphone may be referred to as a first distance, and the distance between the second earphone and an ear corresponding to the second earphone may be referred to as a second distance. A proximity sensor may be arranged at a front surface of the first earphone and the second earphone, for example, as shown in FIG. 5. FIG. 5 is a schematic diagram showing another position of a proximity sensor arranged on an earphone according to the present invention.

Step 302: Obtain the first distance and the second distance according to the sense signals, and respectively compare the first distance with a first preset threshold and the second distance with the first preset threshold.

In this embodiment, the implementation of step 302 is similar to the implementation of step 102 in FIG. 1, and will not be described repeatedly herein. It should be noted that because the proximity sensor is arranged on the front surface of the earphone, the proximity sensor is allowed not to touch the skin on an ear, thereby enhancing comfort for the user and reducing injury caused by a proximity sensor touching the skin. In addition, the proximity sensor may further accurately determine the distance between an earphone and an ear canal, thereby inferring a depth in which the earphone is inserted, and identifying a user's action of taking off or inserting the earphone.

Step 303: Within a first preset time, if the first distance is greater than the first preset threshold and the second distance is smaller than or equal to the first preset threshold, close an earphone channel of the first earphone.

In this embodiment, if the user equipment determines, according to a received sense signal sent by a proximity sensor arranged on the first earphone, that within the first preset time, the first distance between the first earphone and the ear corresponding to the first earphone is greater than the first preset threshold, and determines, according to a received sense signal sent by a proximity sensor arranged on the second earphone, that within the first preset time, the second distance between the second earphone and the ear corresponding to the second earphone is smaller than or equal to the first preset threshold, that is, the user equipment identifies that the user takes off only the first earphone, then the user equipment closes the earphone channel of the first earphone, thereby more effectively prolonging the service life of the earphone.

It should be noted that when the user takes off the first earphone and the second earphone, the user equipment may also determine, according to a received sense signal sent by the proximity sensor arranged on the first earphone, that the distance between the first earphone and the ear canal is greater than the first preset threshold, and determine, according to a received sense signal sent by the proximity sensor arranged on the second earphone, that the distance between the second earphone and the ear corresponding to the earphone is greater than the first preset threshold, and then close the audio playing program.

In this embodiment, a sense signal is collected and obtained; the distance between an earphone and an ear canal is obtained according to the sense signal; and within a first preset time, if a first distance between a first earphone and an ear is greater than a first preset threshold, and a second distance between a second earphone and an ear is smaller than or equal to the first preset threshold, an earphone channel of the first earphone is closed, thereby more effectively prolonging the service life of the earphone and saving energy for the user equipment.

Figure 6:
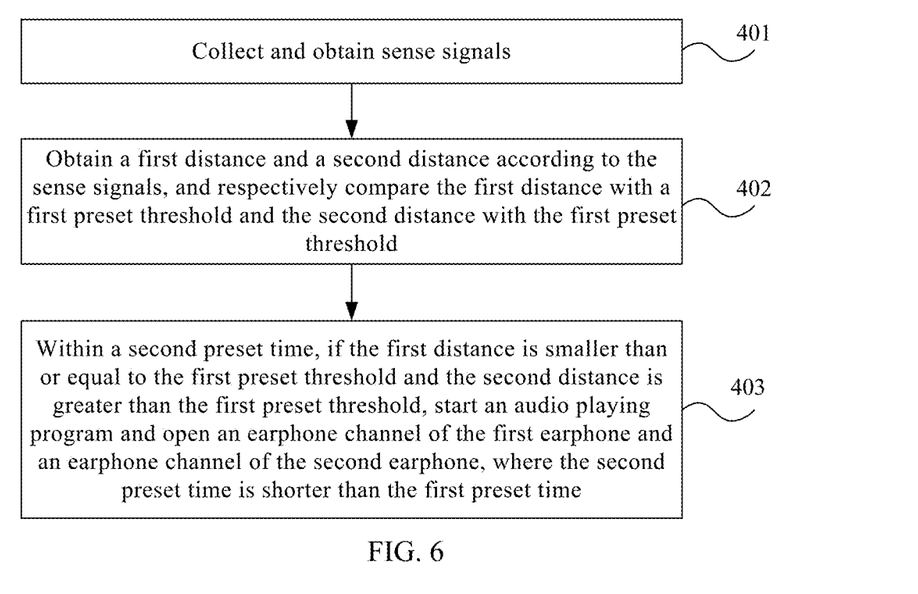
FIG. 6 is a flowchart of a processing method for an earphone according to another embodiment of the present invention.

FIG. 6 is a flowchart of a processing method for an earphone according to another embodiment of the present invention. As shown in FIG. 6, the method according to this embodiment includes the following steps.

Step 401: Collect and obtain sense signals.

In this embodiment, the implementation of step 401 is similar to the implementation of step 101 in FIG. 1, and will not be described repeatedly herein. It should be noted that the earphone may include a first earphone and a second earphone, where the distance between the first earphone and an ear corresponding to the first earphone may be referred to as a first distance, and the distance between the second earphone and an ear corresponding to the second earphone may be referred to as a second distance.

Step 402: Obtain the first distance and the second distance according to the sense signals, and respectively compare the first distance with a first preset threshold and the second distance with the first preset threshold.

In this embodiment, the implementation of step 402 is similar to the implementation of step 102 in FIG. 1, and will not be described repeatedly herein.

Step 403: Within a second preset time, if the first distance is smaller than or equal to the first preset threshold and the second distance is greater than the first preset threshold, start an audio playing program and open an earphone channel of the first earphone and an earphone channel of the second earphone, where the second preset time is shorter than the first preset time.

In this embodiment, if the user equipment performs earphone close processing by using the processing method for an earphone according to the embodiment shown in FIG. 2, when the user inserts the first earphone of the two earphones, the user equipment receives a sense signal sent by a proximity sensor on the first earphone, and determines, according to the sense signal, that within the second preset time, the first distance is smaller than or equal to the first preset threshold, that is, the user equipment identifies that the user inserts the first earphone, then the user equipment starts the audio playing program, and opens the earphone channel of the first earphone and the earphone channel of the second earphone. It should be noted that, to enhance the user experience, the waiting time (second preset time) for starting an earphone may be shorter than the waiting time (first preset time) for closing the earphone.

In this embodiment, a sense signal is collected and obtained; the distance between an earphone and an ear canal is obtained according to the sense signal; and within a second preset time, if the first distance is smaller than or equal to the first preset threshold, the audio playing program is started, thereby automatically closing or starting an audio playing program according to an identified user action of taking off or inserting an earphone, which effectively prolongs the service life of the earphone and implements energy saving for the user equipment.

Further, in another embodiment of the present invention, the implementation of step 403 may be within the second preset time, if the first distance is smaller than or equal to the first preset threshold and the second distance is greater than the first preset threshold, starting the audio playing program and opening the earphone channel of the first earphone.

In this embodiment, if the user equipment performs earphone close processing by using the processing method for an earphone according to the embodiment shown in FIG. 2, when a user inserts the first earphone, the user equipment determines, according to a received sense signal sent by the proximity sensor arranged on the first earphone, that within a second preset time, the first distance between the first earphone and the ear is smaller than or equal to the first preset threshold, and determines, according to a received sense signal sent by the proximity sensor arranged on the second earphone, that within the first preset time, the second distance between the second earphone and an ear is greater than the first preset threshold, then the user equipment starts an audio playing program and opens an earphone channel of the first earphone. Because the second earphone is not inserted into the ear corresponding to the second earphone, an earphone channel of the second earphone is not opened, so that when the user uses only the first earphone to listen to an audio, the user equipment works only with the first earphone, thereby more effectively prolonging the service life of the earphone.

Further, in another embodiment of the present invention, before starting an audio playing program, a user equipment may also read stored audio information, and then start the audio playing program according to the audio information, so that the user equipment may start the audio playing program according to the audio information at the close time before playing, thereby improving use convenience for the user.

Further, to improve use convenience for the user, in another embodiment of the present invention, after a user equipment starts an audio playing program, a processing method for an earphone may further include within a third preset time, if the first distance and/or the second distance is smaller than or equal to a second preset threshold, increasing volume of the first earphone and/or the second earphone, or within the third preset time, if the first distance and/or the second distance is greater than the second preset threshold, decreasing the volume of the first earphone and/or the second earphone.

It should be noted that the third preset time is shorter than the second preset time, and that the second preset threshold is smaller than the first preset threshold.

For example, when a user inserts a first earphone and a second earphone, a user equipment starts an audio playing program, and a user finds that volume of the audio is too low and inserts the first earphone and the second earphone deeper, the user equipment determines, according to received sense signals sent by proximity sensors arranged on the first earphone and the second earphone, that within a third preset time, the distance between the first earphone and an ear and the distance between the second earphone and another ear are respectively smaller than or equal to the second preset threshold, and then increases volume of the first earphone and the second earphone.

A specific implementation of decreasing earphone volume may be as follows: When a user inserts a first earphone and a second earphone, a user equipment starts an audio playing program, and the user finds that audio volume is too high, immediately takes the first earphone and the second earphone off ears, and after a third preset time, for example, 3 seconds, inserts the first earphone and the second earphone into the ears again, the user equipment determines, according to received sense signals sent by proximity sensors arranged on the first earphone and the second earphone, that within the third preset time, the distance between the first earphone and an ear and the distance between the second earphone and another ear are respectively greater than the second preset threshold, and then decreases volume of the first earphone and the second earphone.

It should be noted that volume of the first earphone and the second earphone to be increased or decreased may be set in advance according to user requirements.

Figure 7:
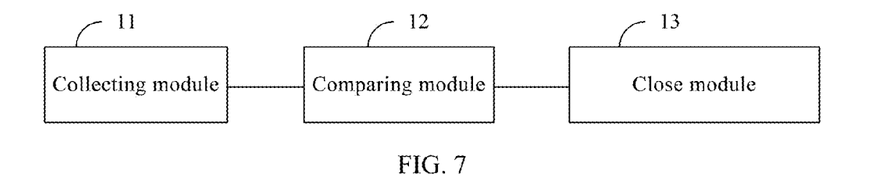
FIG. 7 is a schematic structural diagram of a user equipment according to an embodiment of the present invention.

FIG. 7 is a schematic structural diagram of a user equipment according to an embodiment of the present invention. As shown in FIG. 7, a user equipment according to this embodiment includes a collecting module 11, a comparing module 12, and a close module 13. The collecting module 11 is configured to collect and obtain a sense signal; the comparing module 12 is configured to obtain the distance between an earphone and an ear corresponding to the earphone according to the sense signal, and compare the distance with a first preset threshold; and the close module 13 is configured to, within a first preset time, if the distance is greater than the first preset threshold, close an audio playing program or close an earphone channel of the earphone.

In this embodiment, the collecting module 11 may specifically be a reflective optical proximity sensor. The user equipment according to this embodiment may be used to implement a technical solution of the method embodiment shown in FIG. 1, and the implementation principle thereof is similar and will not be described repeatedly herein.

In this embodiment, a sense signal is collected and obtained; the distance between an earphone and an ear corresponding to the earphone is obtained according to the sense signal; and within a first preset time, if the distance is greater than a first preset threshold, an audio playing program is closed or an earphone channel of the earphone is closed. A user's action of taking off an earphone is identified by receiving a sense signal sent by a proximity sensor to automatically close an audio playing program, thereby prolonging the service life of the earphone and saving energy for the user equipment.

Figure 8:
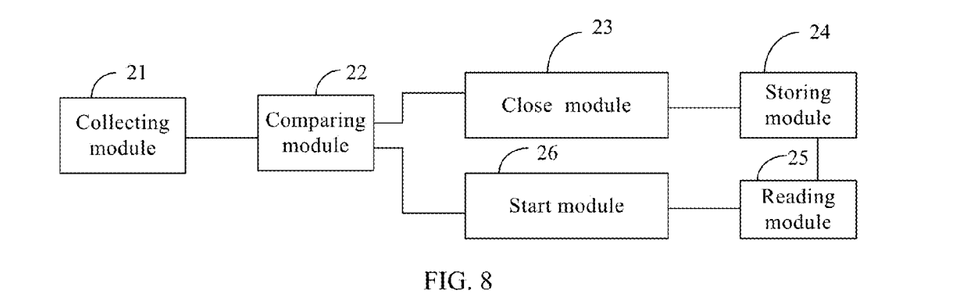
FIG. 8 is a schematic structural diagram of a user equipment according to another embodiment of the present invention.

FIG. 8 is a schematic structural diagram of a user equipment according to another embodiment of the present invention. As shown in FIG. 8, a user equipment according to this embodiment includes a collecting module 21, a comparing module 22, a close module 23, a storing module 24, a reading module 25, and a start module 26. The collecting module 21 is configured to collect and obtain a sense signal. The comparing module 22 is configured to obtain a first distance between a first earphone and an ear corresponding to the first earphone and a second distance between a second earphone and an ear corresponding to the second earphone according to the sense signal, and respectively compare the first distance with a first preset threshold and the second distance with the first preset threshold. The close module 23 is configured to: within a first preset time, if the first distance is greater than the first preset threshold and the second distance is smaller than or equal to the first preset threshold, close an audio playing program. The storing module 24 is configured to store audio information when the audio playing program is being closed. The reading module 25 is configured to read the stored audio information. The start module 26 is configured to: within a second preset time, if the first distance is smaller than or equal to the first preset threshold, start the audio playing program and open an earphone channel of the first earphone and an earphone channel of the second earphone.

In this embodiment, when the close module 23 closes the audio playing program, the storing module 24 is configured to store audio information at the close time. When starting the audio playing program, the start module 26 may read the stored audio information from the storing module 24 by using the reading module 25, and start the audio playing program according to the audio information.

The user equipment according to this embodiment may be used to implement technical solutions of the method embodiments shown in FIG. 2 and FIG. 6; the implementation principle thereof is similar and will not be described repeatedly herein.

The following describes the technical solution in this embodiment in detail by using a user equipment which is a mobile phone and of which an earphone is an earphone with a USB interface as an example. Specifically, the collecting module 21 of the user equipment may specifically be a reflective optical proximity sensor and be arranged on the earphone having the USB interface, and the earphone having the USB interface is an earphone having an interface with at least 5 data wires. The comparing module 22, the close module 23, the storing module 24, the reading module 25, and the start module 26 of the user equipment may be arranged separately or integrated on the mobile phone.

In this embodiment, when a user listens to music by using the mobile phone, the collecting module 21 collects and obtains sense signals in real time, and sends the sense signals to the comparing module 22. The comparing module 22 obtains a first distance and a second distance according to the received sense signals, and respectively compares the first distance with a first preset threshold and the second distance with the first preset threshold. When the user takes off the first earphone, within the first preset time, if the close module 23 determines that the first distance is greater than the first preset threshold and that the second distance is smaller than or equal to the first preset threshold, the mobile phone closes the audio playing program, that is, stops playing music. The storing module 24 stores audio information at the close time. When the user inserts the first earphone back to the ear, the start module 26, within the second preset time, if the first distance is smaller than or equal to the first preset threshold, reads the stored audio information from the storing module 24 by using the reading module 25, and starts the audio playing program according to the audio information, and opens the earphone channel of the first earphone and the earphone channel of the second earphone.

In this embodiment, when the user takes off the first earphone, a sense signal is collected and obtained; the distance between an earphone and a wall of an ear canal is obtained according to the sense signal; and within the first preset time, if the first distance is greater than the first preset threshold and the second distance is smaller than or equal to the first preset threshold, the audio playing program is closed. Meanwhile, when the user inserts the first earphone, a sense signal is collected and obtained; the distance between the earphone and the wall of the ear canal is obtained according to the sense signal; and within the second preset time, if the first distance is smaller than or equal to the first preset threshold, the audio playing program is started, thereby automatically closing or starting the audio playing program according to an identified user action of taking off or inserting an earphone, which effectively prolongs the service life of the earphone and implements energy saving for the user equipment.

Further, on the basis of the above embodiment, when the user equipment starts the audio playing program and the user takes off the first earphone and/or the second earphone, the close module 23 may also be specifically configured to: within the first preset time, if the first distance is greater than the first preset threshold and the second distance is smaller than or equal to the first preset threshold, close the earphone channel of the first earphone.

The user equipment according to this embodiment may be used to implement a technical solution of the method embodiment shown in FIG. 4; the implementation principle thereof is similar and will not be described repeatedly herein.

In this embodiment, a sense signal is collected and obtained; the distance between an earphone and an ear canal is obtained according to the sense signal; the distance is compared with a first preset threshold; and within the first preset time, if the first distance is greater than the first preset threshold and the second distance is smaller than or equal to the first preset threshold, the earphone channel of the first earphone is closed, thereby effectively prolonging the service life of the earphone, enhancing the user experience, and saving energy for the user equipment.

Further, on the basis of the above embodiment, when the user equipment closes the audio playing program and the user inserts the first earphone and/or the second earphone, the start module 26 may also be configured to: within the second preset time, when the first distance is smaller than or equal to the first preset threshold and the second distance is greater than the first preset threshold, start the audio playing program and open the earphone channel of the first earphone.

Further, on the basis of the above embodiment, the user equipment may also include a volume-increasing module or a volume-decreasing processing module, where the volume-increasing module is configured to: within a third preset time, if the first distance and/or the second distance is smaller than or equal to a second preset threshold, increase volume of the first earphone and/or the second earphone; and the volume-decreasing module is configured to: within the third preset time, if the first distance and/or the second distance is greater than the second preset threshold, decrease the volume of the first earphone and/or the second earphone. The third preset time is shorter than the second preset time, and the second preset threshold is smaller than the first preset threshold.

Persons of ordinary skill in the art should understand that all or a part of the steps of the method according to the embodiments may be implemented by a program instructing relevant hardware. The program may be stored in a computer readable storage medium or a chip and a circuit on which the program may run. When the program runs, the steps of the method according to the embodiments are performed. The storage medium may be any medium which is capable of storing program codes, such as a ROM, a RAM, a magnetic disk, or a CD-ROM.

Finally, it should be noted that the embodiments of the present invention are intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments or make equivalent substitutions to some technical features thereof, without departing from the spirit and scope of the technical solutions of the embodiments of the present invention.

What is claimed is:

1. A processing method for an earphone, the method comprising:
   obtaining a sense signal;
   obtaining a distance between an earphone and an ear corresponding to the earphone according to the sense signal;
   comparing the distance with a first preset threshold;
   closing an audio connection of the earphone if the distance is greater than the first preset threshold for a first preset time after obtaining the sense signal;
   starting an audio playing program and opening an earphone channel of the earphone in response to the distance being less than or equal to the first preset threshold for a second preset time; and
   increasing a volume of the earphone channel while the audio playing program is playing and the earphone channel of the earphone is open and in response to the distance changing to be less than or equal to a second preset threshold for a third preset time, wherein the second preset threshold is smaller than the first preset threshold.

2. The method according to claim 1, wherein closing the audio connection comprises closing the audio playing program.

3. The method according to claim 1, wherein closing the audio connection comprises closing the earphone channel of the earphone.

4. The method according to claim 1, wherein the earphone comprises a first earphone and a second earphone, the distance comprises a first distance between the first earphone and a first ear corresponding to the first earphone and a second distance between the second earphone and a second ear corresponding to the second earphone, and the closing comprises:
   closing at least one of the audio playing program or the earphone channel of the first earphone in response to the first distance being greater than the first preset threshold for the first preset time and further in response to the second distance being less than or equal to the first preset threshold for the first preset time.

5. The method according to claim 4, further comprising storing audio information when the audio playing program is being closed.

6. The method according to claim 5, wherein starting the audio playing program comprises starting the audio playing program and opening the earphone channel of the first earphone and the earphone channel of the second earphone in response to the first distance being than or equal to the first preset threshold for a second preset time; and
   wherein the second preset time is less than the first preset time.

7. The method according to claim 6, further comprising reading the stored audio information, wherein starting the audio playing program comprises starting the audio playing program according to the audio information.

8. The method according to claim 6, wherein the increasing the volume comprises increasing volume of the first earphone and the second earphone in response to at least one of the first distance and the second distance being less than or equal to the second preset threshold for the third preset time, wherein the third preset time is shorter than the second preset time.

9. The method according to claim 6, further comprising decreasing volume of at least one of the first earphone and the second earphone in response to at least one of the first distance and the second distance changing, and after changing, being greater than the second preset threshold for the third preset time, wherein the third preset time is shorter than the second preset time, and the second preset threshold is smaller than the first preset threshold.

10. The method according to claim 1, wherein a reflective optical proximity sensor is used to collect and obtain the sense signal and the proximity sensor is arranged on the earphone.

11. The method according to claim 10, wherein the proximity sensor transfers the sense signal to user equipment via a data wire.

12. A user equipment, comprising:
    sensor configured to collect and obtain a sense signal;
    a processor connected to the sensor;
    a non-transitory computer readable medium connected to the processor and having stored thereon instructions that, when executed by the processor, cause the processor to:
       obtain a distance between an earphone and an ear corresponding to the earphone according to the sense signal and to compare the distance with a first preset threshold;
       close an audio playing program or close an earphone channel of the earphone if the distance is greater than the first preset threshold for a first preset time after obtaining the sense signal;
       start an audio playing program and open an earphone channel of the earphone in response to the distance being less than or equal to the first preset threshold for a second preset time; and
       increase a volume of the earphone channel while the audio playing program is playing and the earphone channel of the earphone is open and in response to the distance changing to be less than or equal to a second preset threshold for a third preset time, wherein the second preset threshold is smaller than the first preset threshold.

13. The user equipment according to claim 12, wherein the earphone comprises a first earphone and a second earphone, the distance comprises a first distance between the first earphone and a first ear corresponding to the first earphone and a second distance between the second earphone and a second ear corresponding to the second earphone, and wherein the instructions causing the processor to close an audio playing program or close an earphone channel comprise instructions that, when executed by the processor, cause the processor to close, if the first distance is greater than the first preset threshold for the first preset time after obtaining the sense signal and the second distance is smaller than or equal to the first preset threshold for the first preset time after obtaining the sense signal, at least one of the audio playing program or an earphone channel of the first earphone.

14. The user equipment according to claim 13, further comprising a storage device connected to the processor;
    wherein the non-transitory computer readable medium further has stored thereon instructions that, when executed by the processor, cause the processor to store audio information on the storage device when the audio playing program is being closed.

15. The user equipment according to claim 13, wherein the non-transitory computer readable medium further has stored thereon instructions that, when executed by the processor, cause the processor to, if the first distance is smaller than or equal to the first preset threshold for a second preset time, perform one of start the audio playing program and open the earphone channel of the first earphone and the earphone channel of the second earphone or start the audio playing program and open the earphone channel of the first earphone.

16. The user equipment according to claim 15, further comprising:
  a storage device connected to the processor;
  wherein the non-transitory computer readable medium further has stored thereon instructions that, when executed by the processor, cause the processor to:
    store audio information when the audio playing program is being closed; and
    read the stored audio information.

17. The user equipment according to claim 15, wherein the non-transitory computer readable medium further has stored thereon instructions that, when executed by the processor, cause the processor to perform one of:
  increase volume of a least one of the first earphone and the second earphone, if at least one of the first distance or the second distance is smaller than or equal to a second preset threshold for the third preset time; or
  decrease the volume of at least one of the first earphone and the second earphone, if at least one of the first distance and the second distance is greater than the second preset threshold for the third preset time;
  wherein the third preset time is shorter than the second preset time, and the second preset threshold is smaller than the first preset threshold.

18. The user equipment claim 12, wherein the user equipment is a mobile phone.

19. The user equipment according to claim 12, wherein the sensor is a reflective optical proximity sensor arranged on the earphone.

20. The user equipment according to claim 19, wherein the proximity sensor is connected to the user equipment through a data wire.

* * * * *